(12) United States Patent
Beckman et al.

(10) Patent No.: US 12,717,871 B2
(45) Date of Patent: Aug. 25, 2026

(54) COMPILER FOR A PARALLEL PROCESSOR

(71) Applicant: GSI Technology Inc., Sunnyvale, CA (US)

(72) Inventors: Brian Beckman, Newcastle, WA (US); John D. Cook, Houston, TX (US)

(73) Assignee: GSI Technology Inc., Sunnyvale, CA (US)

( * ) Notice: Subject to any disclaimer, the term of this patent is extended or adjusted under 35 U.S.C. 154(b) by 1020 days.

(21) Appl. No.: 17/856,995

(22) Filed: Jul. 3, 2022

(65) Prior Publication Data

US 2023/0035474 A1 Feb. 2, 2023

Related U.S. Application Data

(60) Provisional application No. 63/356,503, filed on Jun. 29, 2022, provisional application No. 63/223,571, filed on Jul. 20, 2021.

(51) Int. Cl.
*G06F 17/16* (2006.01)
*G06F 7/544* (2006.01)

(52) U.S. Cl.
CPC .............. *G06F 17/16* (2013.01); *G06F 7/544* (2013.01); *G06F 2207/4802* (2013.01)

(58) Field of Classification Search
CPC ........ G06F 17/16; G06F 7/544; G06F 7/5443; G06F 2207/4802; G06F 2207/4804
See application file for complete search history.

(56) References Cited

U.S. PATENT DOCUMENTS

| | | | | |
|---|---|---|---|---|
| 10,777,262 | B1 * | 9/2020 | Haig | G11C 15/04 |
| 2011/0013442 | A1 * | 1/2011 | Akerib | G11C 29/34 365/49.1 |
| 2020/0150926 | A1 * | 5/2020 | Connor | G06F 9/3001 |
| 2021/0097130 | A1 * | 4/2021 | Liu | H03M 7/3066 |
| 2021/0182359 | A1 * | 6/2021 | Olsson | G06F 7/72 |
| 2022/0405571 | A1 * | 12/2022 | Darvish Rouhani | G06N 3/0499 |

* cited by examiner

*Primary Examiner* — Carlo Waje
(74) *Attorney, Agent, or Firm* — Heidi Brun Associates Ltd.; Heidi M. Brun

(57) ABSTRACT

A method for concurrently performing multiple computations in an associative processing unit (APU) includes having data in two matrices, representing data in two portions of a memory array of the APU, creating a Tartan matrix by computing an outer product between a first bit vector indicating selected rows and a second bit vector indicating selected columns, the Tartan matrix representing data stored in a third portion of the memory array wherein all cells having a value 1 in the Tartan matrix indicate selected cells, concurrently activating all cells of the matrices and storing a result of Boolean operations therebetween in one of the two matrices, wherein a new value is obtained on cells located at a same row and a same column as the selected cells in the Tartan matrix and an original value remains on other cells.

14 Claims, 15 Drawing Sheets

| | | | | | | | |
|---|---|---|---|---|---|---|---|
| | 1 | 1 | | | | 1 | 1 |
| 1 | 1 | 1 | 1 | 1 | 1 | 1 | 1 |
| 1 | | | 1 | 1 | 1 | | |
| | 1 | 1 | 1 | 1 | 1 | | 1 |
| | | | 1 | 1 | | | |
| | 1 | | | | | | |

D

COMPILER FOR A PARALLEL PROCESSOR

CROSS REFERENCE TO RELATED APPLICATIONS

This application claims priority from U.S. provisional patent applications 63/223,571 filed Jul. 20, 2021, and 63/356,503, filed Jun. 29, 2022, both of which are incorporated herein by reference.

FIELD OF THE INVENTION

The present invention relates to an associative processing unit (APU) generally and to a compiler for a parallel processor in particular.

BACKGROUND OF THE INVENTION

The Gemini Associative Processing Unit (APU), commercially available from GSI Technology Inc. of the USA, changes the concept of computing from serial data processing, where data is moved back and forth between the processor and memory, to massive parallel data processing, compute, and search in-place directly in the memory array. This in-place associative computing technology removes the bottleneck at the I/O between the processor and memory. Data is accessed by content and processed directly in place in the memory array without having to cross the I/O. The result is an orders of magnitude performance-over-power ratio improvement compared to conventional methods that use CPU and GPGPU (General Purpose GPU) along with dynamic random-access memory (DRAM).

GSI's Gemini APU comprises a memory array of cells arranged in rows and columns. Cells in a row are connected by a word-line and cells in a column are connected by a bit-line.

Boolean operations are performed on the bit-lines connecting activated cells, and a cell is activated when both its word-line and its bit-line are activated. The APU supports concurrently activating a plurality of cells dispersed in the memory array. Therefore, data stored in a large number of columns are all accessible at once which enables in-memory computation capabilities between the plurality of cells connected by a single bit-line in a column, as well as concurrent computations on a plurality of bit-lines.

The APU directly supports selecting rows in its commands and instructions. Selecting rows implies that the APU performs a command in parallel on specified rows, but only on the specified rows. The columns however must be handled at the application level.

An assembly-like programming language (APL) is used to program the APU. The APL is designed to utilize the capabilities of the APU but is not easy for algorithm designers and programmers to use.

Programming applications using the APL is time-consuming and labor-intensive. The programmer needs to explicitly specify and activate all the cells in a column participating in each computation and then specify the operations using Boolean algebra. This type of programming is inconvenient and troublesome and is not easy to use for implementing mathematical expressions.

SUMMARY OF THE PRESENT INVENTION

There is provided, in accordance with a preferred embodiment of the present invention, a method for concurrently performing multiple computations in an associative processing unit (APU). The method includes having data in a donor matrix and in a left receiver matrix, wherein the matrices represent data stored in a first portion and a second portion of a memory array of the APU, respectively, and wherein each portion comprises cells arranged in rows and columns, wherein activating a first cell and a second cell located on a same location in different portions provides a result of a Boolean operation between the first and second cells. The method further includes creating a Tartan matrix by computing an outer product between a first bit vector indicating selected rows and a second bit vector indicating selected columns, wherein the Tartan matrix represents data stored in a third portion of the memory array and wherein all cells having a value 1 in the Tartan matrix are selected cells, concurrently activating all cells of the donor matrix, the left receiver matrix and the Tartan matrix and storing a result of Boolean operations therebetween in the left receiver matrix wherein a new value is obtained on cells located at a same row and a same column as the selected cells in the Tartan matrix and an original value remains on other cells.

Additionally, in accordance with a preferred embodiment of the present invention, the step of creating a Tartan matrix includes initializing cells in the third portion to a value of 0 and concurrently setting a value of 1 to cells located in any of the selected rows and selected columns in the third portion.

Furthermore, in accordance with a preferred embodiment of the present invention, the concurrently activating further includes the following steps: concurrently performing a XOR Boolean operation between all cells storing the donor matrix and all cells storing the left receiver matrix and storing a result in a temporary matrix stored in a temporary portion of the memory array, concurrently performing an AND Boolean operation between all cells of the Tartan matrix and all cells of the temporary matrix and storing a result in the temporary matrix, concurrently performing a XOR Boolean operation between all cells of the left receiver matrix and all cells of the temporary matrix and storing a result in the temporary matrix and concurrently copying all cells of the temporary matrix to the left receiver matrix thereby providing in the left receiver matrix a value of selected cells of the donor matrix.

Still further, in accordance with a preferred embodiment of the present invention, the concurrently activating further includes the following steps: concurrently performing an AND Boolean operation between all cells of the donor matrix and all cells of the Tartan matrix and storing a result in a temporary matrix stored in a temporary portion of the memory array, concurrently performing a XOR Boolean operation between all cells of the left receiver matrix and all cells of the temporary matrix and storing a result in the temporary matrix and concurrently copying all cells of the temporary matrix to the left receiver matrix thereby providing in the left receiver matrix a result of a XOR operation between selected cells of the left receiver matrix and selected cells of the donor matrix.

Still further, in accordance with a preferred embodiment of the present invention, the concurrently activating further includes the following steps: concurrently performing an AND Boolean operation between all cells of the donor matrix and all cells of the left receiver matrix and storing a result in a temporary matrix stored in a temporary portion of the memory array, concurrently performing a XOR Boolean operation between all cells of the left receiver matrix and all cells of the temporary matrix and storing a result in the temporary matrix, concurrently performing an AND Boolean operation between all cells of the Tartan matrix and all cells of the temporary matrix and storing a result in the temporary matrix, concurrently performing a XOR Boolean operation between all cells of the left receiver matrix and all cells of the temporary matrix and storing a result in the temporary matrix and concurrently copying all cells of the temporary matrix to the left receiver matrix thereby providing in the left receiver matrix a result of an AND operation between selected cells of the left receiver matrix and selected cells of the donor matrix.

Additionally, in accordance with a preferred embodiment of the present invention, the concurrently activating further includes the following steps: concurrently performing an AND Boolean operation between all cells of the donor matrix and all cells of the left receiver matrix and storing a result in a temporary matrix stored in a temporary portion of the memory array, concurrently performing a XOR Boolean operation between all cells of the left receiver matrix and all cells of the temporary matrix and storing a result in the temporary matrix, concurrently performing an AND Boolean operation between all cells of the temporary matrix and all cells of the Tartan matrix and storing a result in the temporary matrix, concurrently performing a XOR Boolean operation between all cells of the left receiver matrix and all cells of the temporary matrix and storing a result in the temporary matrix, and concurrently copying all cells of the temporary matrix to the left receiver matrix thereby providing in the left receiver matrix a result of an OR operation between selected cells of the left receiver matrix and selected cells of the donor matrix.

Moreover, in accordance with a preferred embodiment of the present invention, the method includes creating a plurality of APU instructions including commands to create the Tartan matrix and commands to perform the Boolean operations between the left receiver matrix, the donor matrix and the Tartan matrix to provide results of the operation on selected cells of the left receiver matrix.

There is provided, in accordance with a preferred embodiment of the present invention, a method for concurrently performing multiple computations in an associative processing unit (APU). The method includes having a plurality of pairs of multi-bit numbers, a first number of each pair stored in cells of a plat of a first vector register storing a donor matrix, a second number of each pair stored in a plat of a second vector register storing a left receiver matrix. The method also includes receiving a section mask bit vector indicating selected sections and a plat mask bit vector indicating selected plats for a computation between the matrices, creating a Tartan matrix by computing an outer product between the section mask and the plat mask and storing the Tartan matrix in a third vector register, wherein a selected cell is indicated by the value 1 in the Tartan matrix and activating bit-lines of the APU connecting cells of the donor matrix, the left receiver matrix and the Tartan matrix and writing a result of a computation back to the left receiver matrix wherein a new value is obtained on selected cells and an original value remains on not selected cells.

Additionally, in accordance with a preferred embodiment of the present invention, the creating a Tartan matrix includes initializing cells in the third vector register to a value of 0 and concurrently setting a value 1 to cells located in a section from the section mask and a plat from the plat mask.

Furthermore, in accordance with a preferred embodiment of the present invention, the activating bit-lines further includes concurrently performing a XOR Boolean operation between all cells of the first vector register storing the donor matrix, and all cells of the second vector register storing the left receiver matrix and storing a result in a temporary vector register, concurrently performing an AND Boolean operation between all cells of the third vector register storing the Tartan matrix and all cells of the temporary vector register and storing a result in the temporary vector register, concurrently performing a XOR Boolean operation between all cells of the second vector register storing the left receiver matrix and all cells of the temporary vector register and storing a result in the temporary vector register and concurrently copying all cells of the temporary vector register to the second vector register thereby providing in the second vector register a value of selected bits of the multi-bit numbers stored in the first vector register.

Additionally, in accordance with a preferred embodiment of the present invention, the concurrently activating further includes concurrently performing an AND Boolean operation between all cells of the first vector register storing the donor matrix, and all cells of the third vector register storing the Tartan matrix and storing a result in a temporary vector register, concurrently performing a XOR Boolean operation between all cells of the second vector register storing the left receiver matrix, and all cells of the temporary vector register and storing a result in the temporary vector register and concurrently copying all cells of the temporary vector register to the second vector register thereby providing in the second vector register a result of a XOR operation between selected bits of the plurality of pairs of multi-bit numbers.

Moreover, in accordance with a preferred embodiment of the present invention, the concurrently activating further includes concurrently performing an AND Boolean operation between all cells of the first vector register storing the donor matrix, and all cells of the second vector register storing the left receiver matrix and storing a result in a temporary vector register; concurrently performing a XOR Boolean operation between all cells of the second vector register storing the left receiver matrix and all cells of the temporary matrix and storing a result in the temporary vector register, concurrently performing an AND Boolean operation between all cells of the third vector register storing the Tartan matrix and all cells of the temporary vector register and storing a result in the temporary vector register, concurrently performing a XOR Boolean operation between all cells of the second vector register storing the left receiver matrix and all cells of the temporary vector register and storing a result in the temporary vector register and concurrently copying all cells of the temporary vector register to the second vector register thereby providing in the second vector register a result of an AND operation between selected bits of the plurality of pairs of multi-bit numbers.

Furthermore, in accordance with a preferred embodiment of the present invention, the concurrently activating further includes concurrently performing a AND Boolean operation between all cells of the first vector register storing the donor matrix, and all cells of the second vector register storing the left receiver matrix and storing a result in a temporary vector register, concurrently performing a XOR Boolean operation between all cells of the first vector register storing the donor matrix and all cells of the temporary vector register and storing a result in the temporary vector register; concurrently performing an AND Boolean operation between all cells of the third vector register storing the Tartan matrix and all cells of the temporary vector register and storing a result in the temporary vector register, concurrently performing a XOR Boolean operation between all cells of the second vector register storing the left receiver matrix and all cells of the temporary vector register and storing a result in the temporary vector register and concurrently copying all cells of the temporary vector register to the second vector register thereby providing in the second vector register a result of an OR operation between selected bits of the plurality of pairs of multi-bit numbers.

Additionally, in accordance with a preferred embodiment of the present invention, the method further includes receiving an operation to perform between said pairs of multi-bit numbers and creating a plurality of APU instructions including commands to create the Tartan matrix and commands to perform Boolean operations between the left receiver matrix, the donor matrix and the Tartan matrix to provide in the second vector register results of the operation between the pairs of multi-bit numbers.

There is provided, in accordance with a preferred embodiment of the present invention, a system. The system includes an APU having a virtual 3D structure of cells in sections, plats and vector registers and a matrix generator at least to convert basic on-plat programming instructions of an application-level program into binary matrix operations to select cells of the virtual 3D structure to implement basic parallel programming operations.

Additionally, in accordance with a preferred embodiment of the present invention, the system includes an assembly-level compiler to convert the programming instructions of an APU assembly-level program using the matrix generator.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
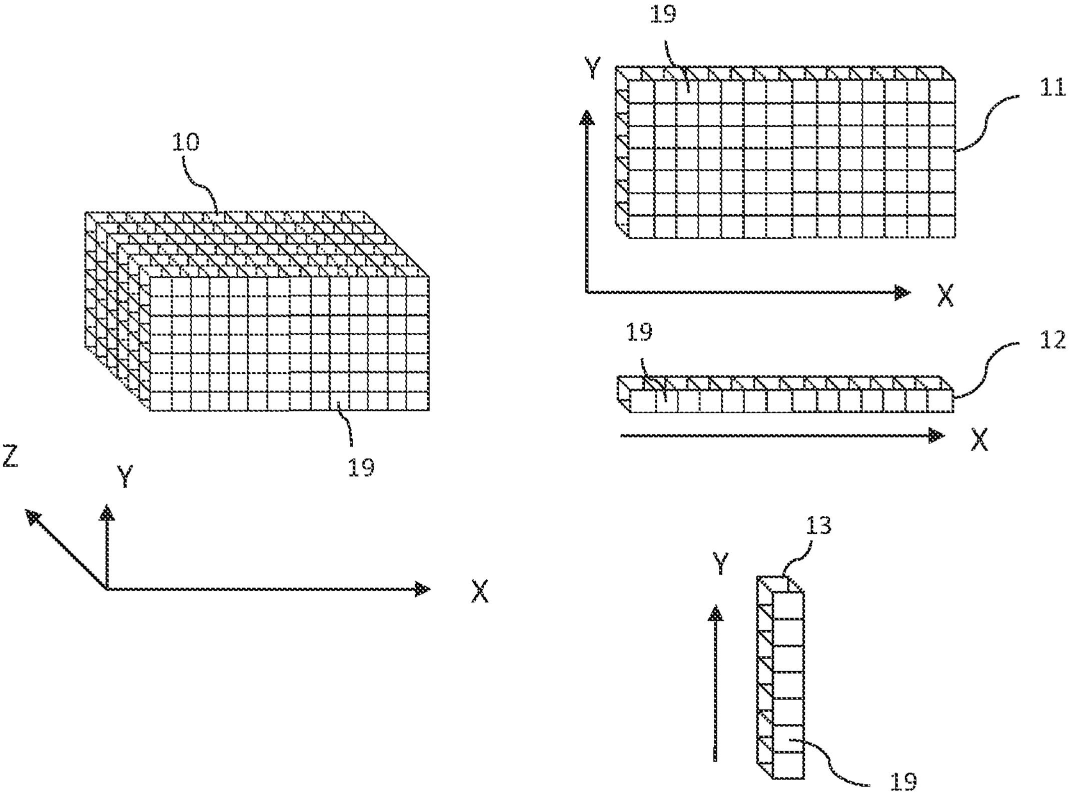
FIG. 1 is a schematic illustration of a 3D model describing a bank of memory cells the APU.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that all basic APU operations can be described compactly in terms of linear-algebra on a binary field (i.e., a field whose elements are only 0 and 1) which is known and easy to use. Modeling the APU elements using concepts and terms of linear-algebra (vectors, matrices, etc.) may facilitate providing a high-level and simple language, based on linear-algebra operations (instead of Boolean algebra used by the APL). Providing a new language (referred herein as Bit-Engine Language of Expression (BELEX)) with its complementary compiler capable of generating machine code from linear-algebra operations, offers an effective and easy-to-use tool for writing straightforward and intuitive software capable of fully utilizing the parallel processing capabilities of the APU.

Representing APU elements as vectors and matrices allows overlaying linear-algebra (which is a well-known mathematical discipline and friendly to a human creator of algorithms) on Boolean algebra (which is more friendly to machine programmers). The purpose of any compiler is to convert math-friendly notation into machine-friendly code, which is what is provided by BELEX. BELEX is a friendly language from which the compiler may generate the relevant APL code to execute on the APU.

Applicant has also realized that the new language, BELEX, may enable the user to specify the plurality of bit-lines where the calculation will be performed in parallel by using a vector of selected rows and a vector of selected columns from which the compiler may generate code for creating a matrix (referred herein as a Tartan matrix) that may be used for selecting specific bit-lines over which a result is desired and leaving other bit lines untouched. In the Tartan matrix, a value 1 in a cell indicates “selected” and the value 0 in a cell indicates “not selected” implying that the bit-line connecting a cell from the Tartan matrix having the value 1 is a selected bit-line, and a bit-line connecting a cell from the Tartan matrix having the value 0 is not selected.

Applicant has further realized that BELEX may provide a plurality of high-level functions to enable (in software) concurrent computation on a plurality of bit-lines. BELEX provides the following basic bitwise operations between matrices: AND (multiply), XOR (add without carry) and ASSIGNMENT that are sufficient for implementing linear-algebra, and OR for convenience purposes. BELEX may provide any additional high-level functions using the ASSIGN, AND and XOR operations. It may be noted that a plurality of multi-bit numbers may be stored in rows and columns of the APU and BELEX may be used to concurrently perform operations between a plurality of pairs of multi-bit numbers.

FIGS. 1, 2A, 2B, 2C and 3 provide an introduction of the terms and ideas used in this application. The actual invention is described afterwards.

FIG. 1, to which reference is now made, is a schematic illustration of a model, used by BELEX, describing a memory bank 10 of the APU. An APU chip may include a plurality of memory banks 10.

Bank 10 may be modeled as a three-dimensional (3D) cube comprising a plurality of one-bit cells 19, arranged in space in dimensions X, Y and Z. In one embodiment, the APU chip comprises 64 banks 10. Bank 10 comprises a plurality of vector registers 11. In the virtual 3D structure, each vector register 11 consists of sections 12 and plat 13.

Vector register 11 is a vertical slice of bank 10 that forms a two-dimensional (2D) array of memory cells 19 arranged in rows in dimension X and columns in dimension Y. In one embodiment, bank 10 comprises 24 vector registers 11 for storing data and performing in-memory computation and additional vector registers, for data transport inside bank 10 and for temporary storage. The first vector register 11 is the first slice of the cube in dimension Z, and the Nth vector register 11 is the Nth slice of the cube in dimension Z.

Section 12 is a horizontal slice of vector register 11 that forms a one-dimensional (1D) vector in dimension X, and plat 13 is a vertical slice of vector register 11 that forms a 1D vector in dimension Y. Plat 13 can be described as a vertical slice across all sections 12 of a vector register 11 and section 12 can be described as a horizontal slice across all plats 13 of a vector register 11. In one embodiment, each vector register 11 comprises 2048 plats 13 and 16 sections 12.

The numbering scheme of sections 12 and plats 13 may be identical in all vector registers i.e., there is a section number j (e.g., 5) in each vector register and there is a plat number k (e.g., 7) in each vector register. Using a single numbering scheme may allow accessing cells 19 in different vector registers using the same scheme.

Figure 2A:
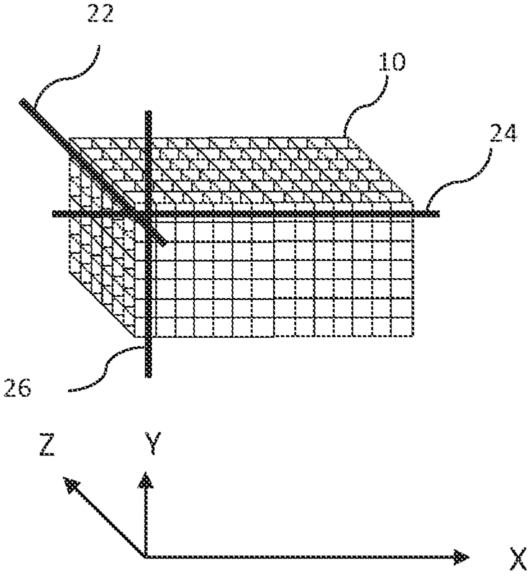
FIG. 2A is a schematic illustration of hardware connectivity between cells of bank in the 3D model.

FIG. 2A, to which reference is now made, is a schematic illustration of hardware connectivity between cells 19 of bank 10 that include bit-lines 22, word-lines 24 and aligned bit-lines 26.

Bit-line 22 connect cells 19 in dimension Z, word-line 24 connects cells 19 in dimension X and aligned bit-line 26 connect cells in dimension Y.

Figure 2B:
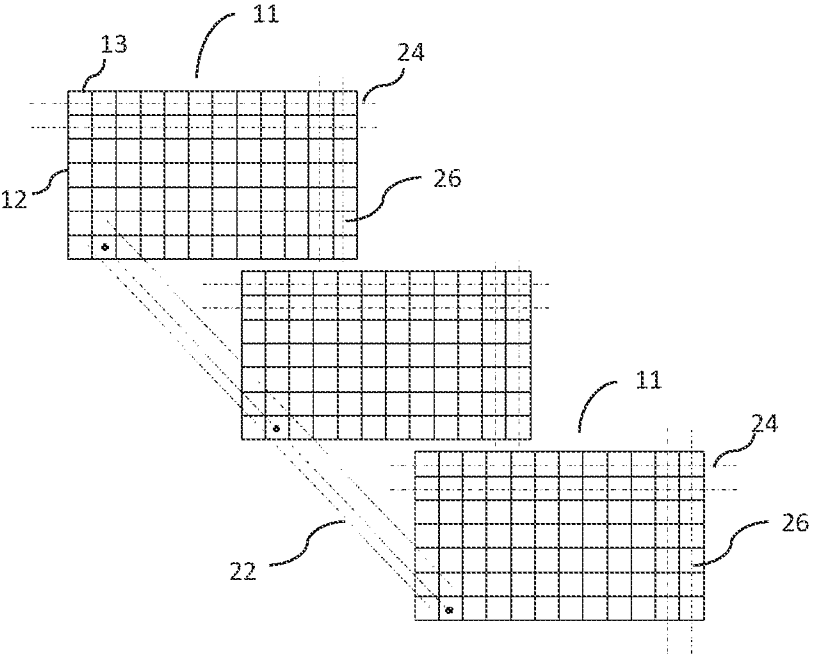
FIG. 2B is another schematic illustration of the connectivity between cells of a bank in the 3D model emphasizing the connectivity between cells inside a single vector register and between multiple vector registers.

FIG. 2B, to which reference is now made, is another schematic illustration of the connectivity between cells of three vector registers 11 each illustrated separately to emphasize the connectivity between cells inside a single vector register 11 and between multiple vector registers 11. Recall that a row of vector register 11 is referred to as section 12 in the virtual 3D structure and a column of vector register 11 is referred to as plat 13 in the virtual 3D structure.

Bit-line 22 connects cells 19 located at the same plat number and same section number in different vector registers 11. In the APU, Boolean operations may be performed between activated cells connected by a bit-line 22.

Word line 24 connects cells 19 across all plats 13 on a single section 12 on a single vector register 11. Activating a word-line 24 adds the data of relevant cells 19 to a computation.

Aligned bit-line 26 connects cells 19 located at the same plat in vector registers 11. In this application, aligned bit-lines 26 are used, in conjunction with word-lines 24, for selecting cells in a vector register 11 and setting values to the relevant cells 19 while a computation is performed on bit-lines 22.

A cell 19 is activated when both its bit-line 22 and its word-line 24, or when both its aligned bit-line 26 and its word-line 24, are simultaneously activated. The APU supports in-memory computation by activating a plurality of cells 19 connected by a bit-line 22 or 24. By concurrently activating a plurality of bit-lines 22 and a plurality of word-lines 24, the APU performs concurrent multiple in-memory computations in each of the activated bit lines 22.

Figure 2C:
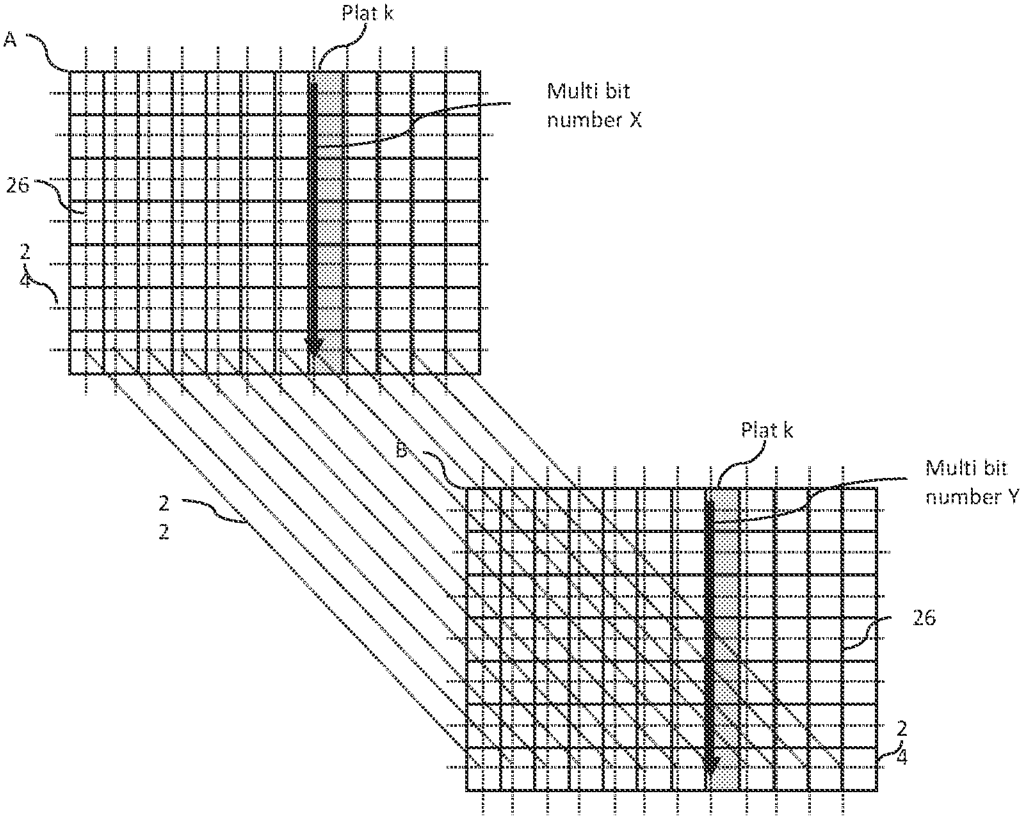
FIG. 2C is a schematic illustration of the store arrangement in the APU for performing an operation between a plurality of two multi-bit numbers.

FIG. 2C, to which reference is now made, is a schematic illustration of the store arrangement in the APU for performing an operation between a plurality of two multi-bit numbers. The first multi-bit number X of the pair may be stored in a plat k of a vector register A, each bit in a different cell 19, and the second multi-bit number Y of the pair may be stored in a plat k (the same plat number) of a vector register B (i.e., storing each bit of the two multi-bit numbers in the same spatial location in dimensions X and Y, but in a different spatial location in dimension Z, i.e., cell [i,j], of different vector registers 11). By activating cells 19 on both vector registers 11, a Boolean operation may be performed between cells 19 connected by bit-line 22.

Figure 3:
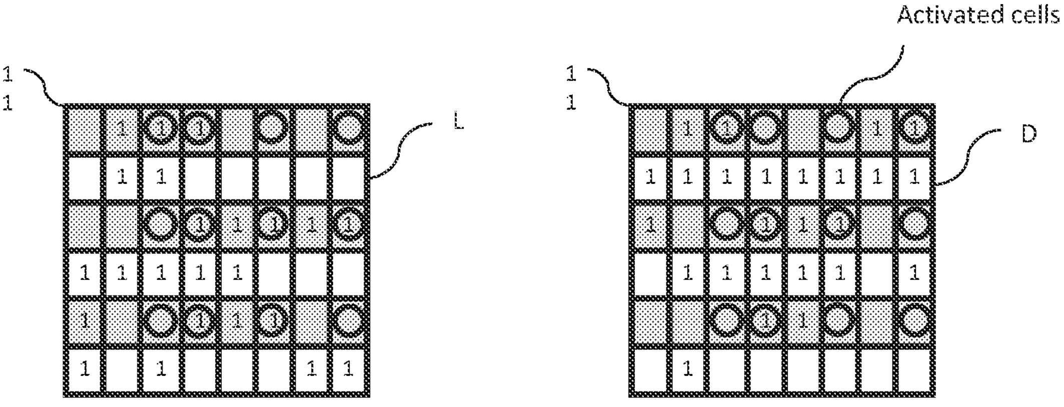
FIG. 3 is a schematic illustration of an example of data stored in two vector registers each storing a plurality of multi-bit numbers.

FIG. 3, to which reference is now made, is a schematic illustration of an example of data stored in two vector registers L and D, each storing a plurality of multi-bit numbers. In the illustration, a value 1 of a bit stored in a cell 19 is indicated by “1” while (for clarity) the value 0 is represented by an empty space. It may be noted that cells 19 in the same position of L and D are connected by bit-line 22 but for clarity, hardware connectivity is omitted, i.e., all word-lines 24 connecting cells 19 on a section 12 (i.e., cells in a row), aligned bit-lines 26 connecting cells 19 in a plat 13 (i.e., cells in a column), and bit-lines 22 connecting cells located in the same position in distinct vector registers 11 are omitted from the figure.

In the APU, cells 19 are activated by activating the relevant bit-lines 22 and the relevant word-lines 24. Activated word lines are marked in the figure with a gray background and for illustrative purposes, activated cells 19 in vector registers D and L are marked with a small circle surrounding their value (activated cells 19 are located in the intersections of activated bit-lines 22 and activated word-lines 24). Other cells 19, that are not in an intersection of an activated bit-line 22 and an activated word-line 24, are not activated and therefore will not participate in a computation.

It may be noted that only the relevant cells 19 in vector registers L and D should be activated in order to perform a computation only between them. The APL programmer needs to selectively activate the relevant bit-lines 22 and the relevant word lines 24 for each and every cell 19 that should participate in a computation.

Applicant has realized that using BELEX may simplify the programming of the APU by activating all bit-lines 22 and word-lines 24 and performing the selection in software. The software selection may be achieved by adding the Tartan matrix to the computation that may ensure that a result is obtained only between relevant bits of matrices D and L although all bit-lines 22 and all word-lines 24 have been selected in hardware.

The creation of the Tartan matrix M may be done by activating specific cells in a vector register 11. The cells may be activated by activating multiple sections 12 and multiple plats 13. Multiple sections may be selected using a section mask, which is a vector having the identifiers of the selected sections 12 in a vector register 11. Multiple plats may be selected using a plat mask, which is a vector having the identifiers of the selected plats 13 in a vector register 11. For example, to select the relevant cells in FIG. 3, the section mask may be [0, 2, 4] and the plat mask may be [2, 3, 5, 7].

Figure 4:
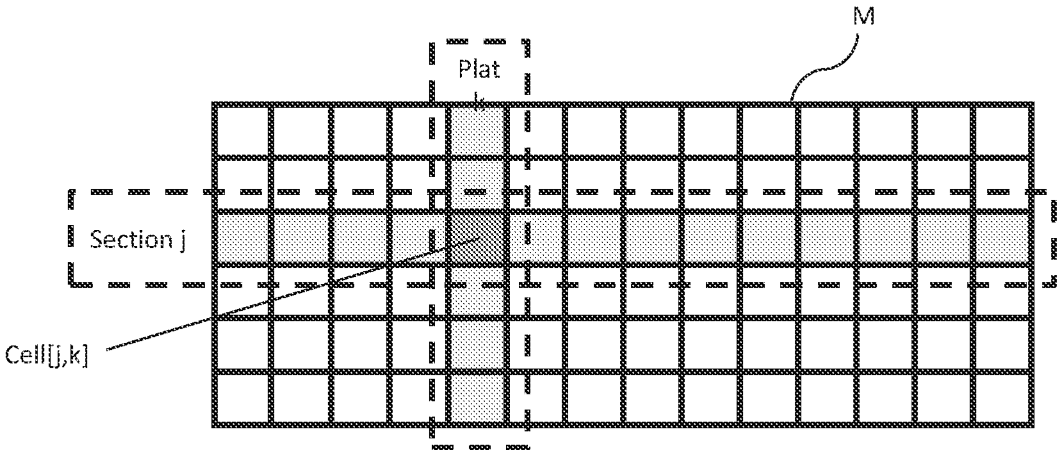
FIG. 4, is a schematic illustration of a cell of a matrix selected by activating a section and a plat.

FIG. 4, to which reference is now made, is a schematic illustration of a cell [j,k] of a matrix M, selected by activating section j and plat k.

In BELEX, a vector register may be perceived as a matrix where the sections are rows of the matrix and the plats are columns of the matrix. Each cell in the matrix stores a bit with a value of 0 or 1. Concurrently activating all cells of two distinct vector registers 11 implies that a bitwise operation is concurrently done between all corresponding cells of the matrices—i.e., performing a linear-algebra operation between corresponding cells of the two matrices.

To concurrently perform a computation between multiple pairs of multi-bit numbers, the first multi-bit number of each pair may be stored in a plat k of a first vector register referred to as a donor matrix (D), the second multi-bit number of each pair may be stored in a plat k of a second vector register referred to as left-hand receiver matrix (L) and the result of the computation may be stored back into the left-hand receiver matrix (L'). It may be noted that the results may be stored to the same vector register L, but the values of L before and after the computation may be different; therefore, the matrix representing the new values is referred as L'.

Activating all cells of L and D will activate a computation on all bit-lines connecting L and D. The procedure of selecting cells for each computation may be achieved by creating a third matrix M relevant for each computation, referred to herein as the Tartan matrix (M), and storing its values in another vector register 11 (in addition to vector registers storing matrices D and L). Tartan matrix M may be built in such a way that activating all bit-lines 22 and all word lines 24 of the three vector registers 11 will produce results only on selected bit-lines 22.

The Tartan matrix M is a "selecting" matrix where the value of selected cells is set to 1 and the value of unselected cells is set to 0 and a computation may change values on cells of matrix L only on bit-lines connecting bits in the Tartan matrix M having a value 1.

The Tartan matrix M may be obtained by computing the outer product between the section mask (a vector of the selected sections (rows of the matrix)) and the plat mask (a vector of the selected plates (columns of the matrix)). It may be noted that keeping the order of the elements of the outer product computation is important and the section mask should be the first vector.

Given two vectors, u of size m×1 and v of size n×1:

$$u = [u_1, u_2, \ldots u_m]$$

$$v = [v_1, v_2, \ldots v_n]$$

The outer product u (⊗) v is defined as the m×n matrix A obtained by multiplying each element of u by each element of v as illustrated in equation 1:

$$u \otimes v = A = \begin{bmatrix} u1v1 & u1v2 & \ldots & u1vn \\ u2v1 & u2v2 & \ldots & u2vn \\ \vdots & \vdots & \ldots & \vdots \\ \vdots & \vdots & \ldots & \vdots \\ umv1 & umv2 & \ldots & umvn \end{bmatrix} \quad \text{Equation 1}$$

In BELEX, u is the section mask, v is the plat mask and A is the Tartan matrix M.

In BELEX, the Tartan matrix is used for selecting which bit-lines 22 should provide results of computations instead of specifically activating each cell 19 in the different vector registers connected by specific bit-lines 22 over which a computation is desired. A cell [j,k] in the Tartan matrix M with the value 1 may be obtained by selecting section j and plat k and setting the value 1 in the selected cells.

Instead of activating specific cells 19 in specific vector registers 11, all bit-lines 22 connecting all cells 19 of all vector registers 11 may be concurrently activated and the actual selection of the specific bit-lines 22 for a computation may be done using the Tartan matrix M in the computation.

The BELEX language may provide a function to create the Tartan matrix M from the section mask and the plat mask.

Figure 5A:
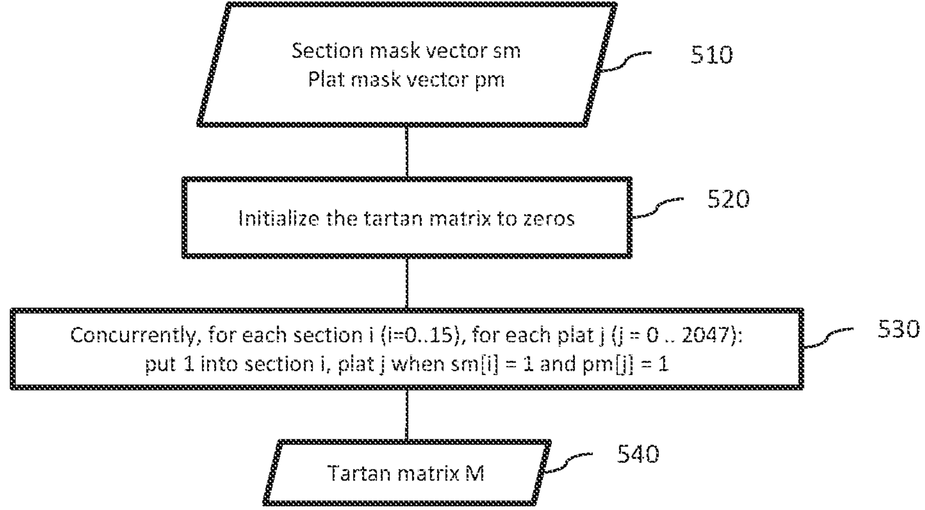
FIG. 5A is a flowchart of a method for creating the Tartan matrix from a section mask and a plat mask according to an embodiment of the present invention.

FIG. 5A, to which reference is now made, is a flowchart of a method for creating the Tartan matrix M from a section mask sm and a plat mask pm.

In step 510, the method may receive as input a section mask vector sm (a vector of selected sections), a plat mask vector pm (a vector of selected plats). In step 520, the method may create a Tartan matrix and initialize it to zero by concurrently setting the value 0 to all cells of the matrix. In the APU, initializing the entire matrix to zero is done concurrently—all cells in the matrix are set at the same time. In step 530, the method may set the value of each junction between a selected section and a selected plat in the Tartan matrix M to 1, which is the outcome of computing the outer product of the section mask sm and the plat mask pm and in step 540 the method provides Tartan matrix M as output. Setting the values of the Tartan matrix M, which is an additional vector register 11 to participate in a computation, may be done by activating the relevant word-lines 24 and the relevant aligned bit-lines 26.

Figure 5B:
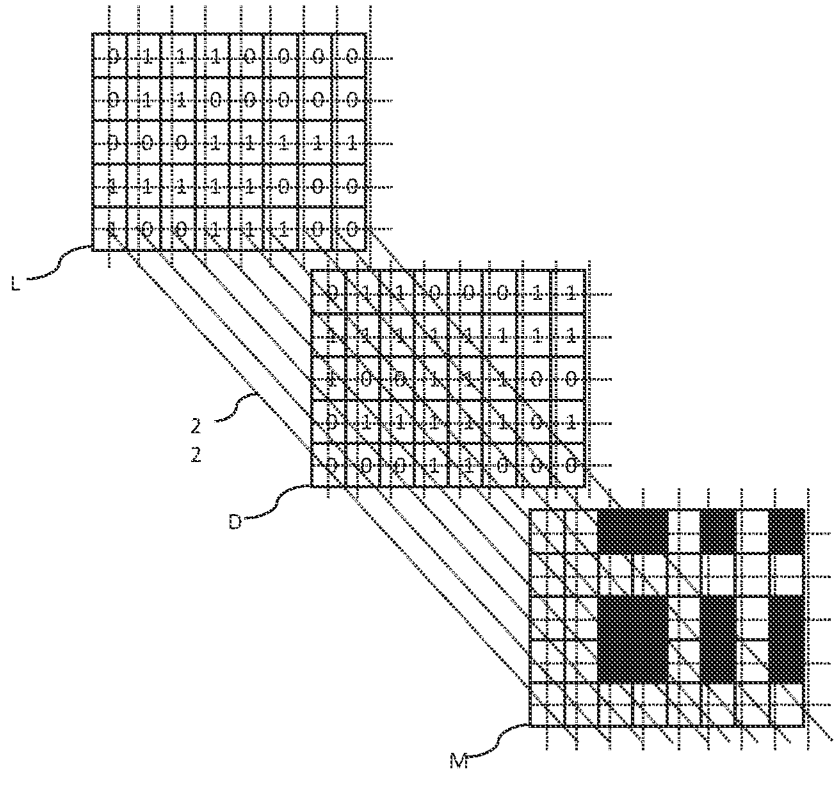
FIG. 5B is a schematic illustration of an example of using the Tartan matrix in conjunction with two additional matrices wherein results may be obtained only in cells marked by the Tartan matrix according to an embodiment of the present invention.

FIG. 5B, to which reference is now made, is a schematic illustration of an example of using the Tartan matrix M in conjunction with matrices L and D, wherein results may be obtained only in cells marked by the Tartan matrix (and shown in FIG. 5B as black cells). The flow of FIG. 5A may create matrix M that may be stored in the APU.

Figure 6:
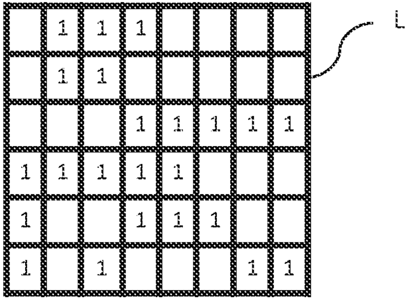
FIG. 6 is a schematic illustration an example of three matrices L and D and a Tartan matrix M according to an embodiment of the present invention.
Figure 6:
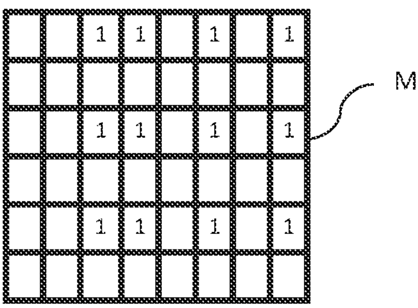

FIG. 6, to which reference is now made, schematically illustrates an example of matrices L and D and a Tartan matrix M that may be created in the APU by calculating the outer product between section mask sm=[0, 0, 1, 0, 1] (the bit vector for selecting sections 0, 2 and 4) and plat mask pm

[0, 0, 1, 1, 0, 1, 0, 1] (the vector for selecting plats 2, 3, 5, 7) as described with respect to FIG. 5.

The BELEX language may provide functions to perform operations such as AND, XOR, OR and ASSIGN using the donor matrix D, the left receiver matrix L and the Tartan matrix M. The BELEX compiler may convert expressions written in linear-algebra, into machine code that may include the Tartan matrix M and concurrently perform computation on all bit-lines 22, while providing results only on selected bit-lines 22 (leaving cells located on other bit-lines 22 unchanged).

In the equations detailed below, the following symbols are used:

L—an original value of a left-hand receiver matrix.

L'—the new value of matrix L after an operation has been performed and the outcome of the operation is stored in matrix L.

M—the Tartan matrix indicating selected cells computed as the outer product of a section mask and a plat mask.

D—the donor matrix

+—a bit wise XOR concurrently and in parallel performed by the APU hardware on all elements of the matrices.

×—a bit wise AND concurrently and in parallel performed by the APU hardware on all elements of the matrices.

It may be noted that all Boolean operations in any flow performing linear algebra operations between matrices are concurrently performed on all bit-lines 22 connecting cells 19 of matrices and the entire bitwise Boolean operation between the entire matrices is done in one step.

The BELEX compiler may support creating APL code for an assignment operation, that may copy data from selected cells 19 in the donor matrix D into the selected cells 19 of a left-hand receiver matrix L.

In BELEX, the assignment of data from D to L in the masked-on positions of L is done using the Tartan matrix M according to equation 2:

$$L' = L + (M \times (L + D)) \quad \text{Equation 2}$$

The equation ensures that data is assigned to L only in those positions where M has on bits (1), leaving original data in L where M has off bits (0).

Figure 7:
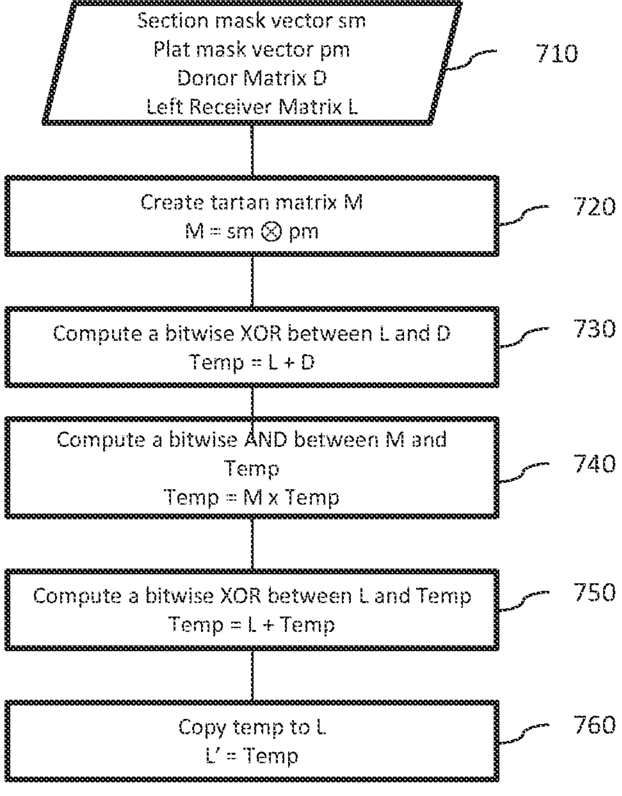
FIG. 7 is a schematic illustration of a flow describing the functionality that implements the concurrent assignment operation of multiple bits according to an embodiment of the present invention.

FIG. 7, to which reference is now made, is a schematic illustration of a flow describing the functionality of the APL code generated by the BELEX compiler that implements the concurrent assignment operation of multiple bits.

In step 710, the flow may receive as input a section mask vector sm (a vector of selected sections), a plat mask vector pm (a vector of selected plats), a donor matrix D and a left receiver matrix L. In step 720, the method may create a Tartan matrix M by computing the outer product between section mask vector sm and plat mask vector pm.

In step 730, the method may compute a bitwise XOR between matrices L and D and may store the result in a temporary matrix Temp. In step 740, the method may compute a bitwise AND between matrices M and Temp and may store the result back to matrix Temp. In step 750, the method may compute a bitwise XOR between matrices L and Temp and may store the result back to matrix Temp. Finally, in step 760, the method may copy matrix Temp back to matrix L.

The BELEX compiler may support creating APL code for an XOR-EQ operation which may replace matrix L with L XOR D in the masked-on positions of L.

In BELEX, the XOR-EQ between data in matrix D and data in matrix L is done using the Tartan matrix M according to equation 3:

$$L' = L + (M \times D) \quad \text{Equation 3}$$

The equation ensures that the replacement is done only in those positions where matrix M has on bits (1) and leave original data in matrix L where matrix M has off bits (0).

Figure 8:
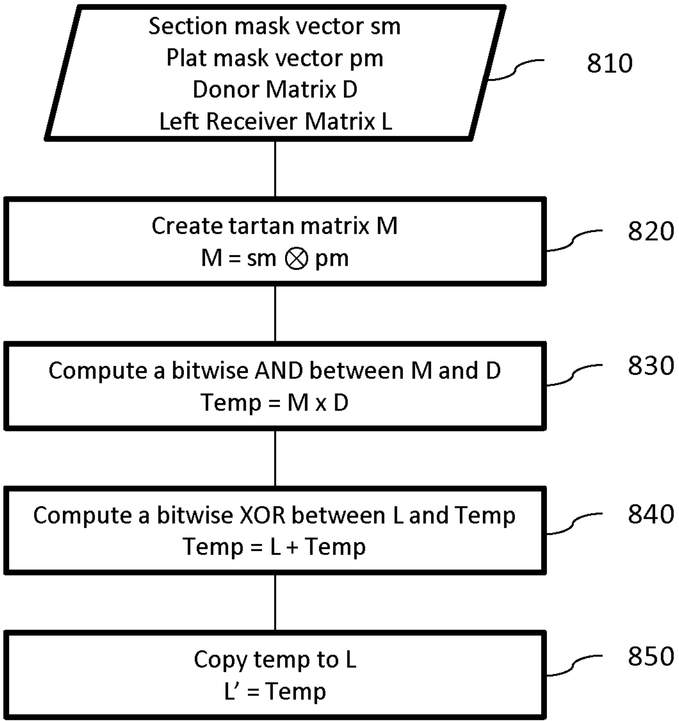
FIG. 8 is a schematic illustration of a method describing the functionality for implementing a concurrent XOR operation between multiple bits according to an embodiment of the present invention.

FIG. 8, to which reference is now made, is a schematic illustration of a method describing the functionality of the APL code generated by the BELEX compiler that implements the concurrent XOR-EQ operation between multiple bits.

In step 810, the method may receive as input a section mask vector sm (a vector of selected sections), a plat mask vector pm (a vector of selected plats) a donor matrix D and a left receiver matrix L. In step 820, the method may create a Tartan matrix M by computing the outer product between section mask vector sm and plat mask vector pm.

In step 830, the method may compute a bitwise AND between matrices M and D and may store the result in a temporary matrix Temp. In step 840, the method may compute a bitwise XOR between matrices L and Temp and may store the result back to matrix Temp and in step 850, the method may copy matrix Temp back to matrix L.

The BELEX compiler may support creating APL code for an AND-EQ operation which may replace matrix L with L AND D in the masked-on positions of L.

In BELEX, the AND-EQ between data in matrix D and data in matrix L is done using the Tartan matrix M according to equation 4:

$$L' = L + M \times (L + (L \times D)) \quad \text{Equation 4}$$

The equation ensures that the replacement is done only in those positions where matrix M has on bits (1) while leaving original data in matrix L where matrix M has off bits (0).

Figure 9:
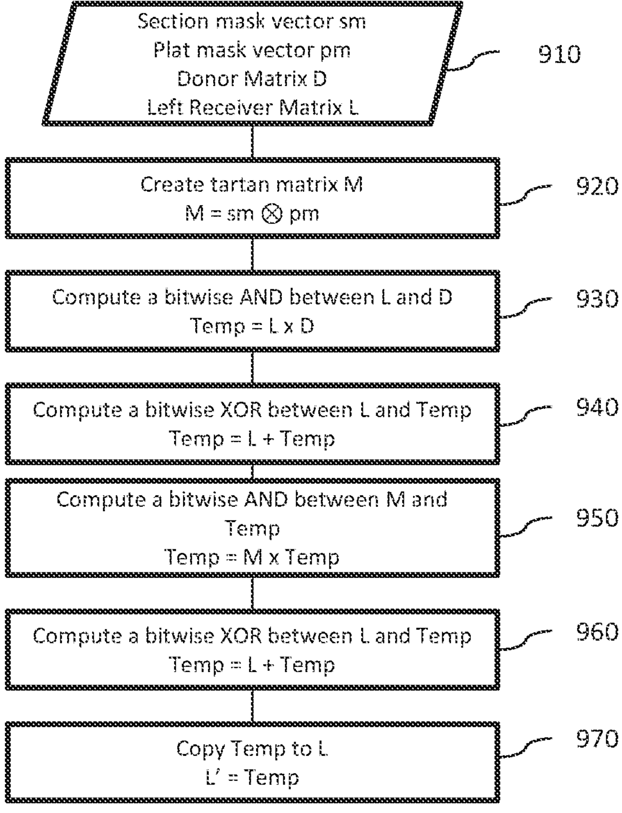
FIG. 9 is a schematic illustration of a method describing the functionality for implementing a concurrent AND operation between multiple bits according to an embodiment of the present invention.

FIG. 9, to which reference is now made, is a schematic illustration of a method describing the functionality of the APL code generated by the BELEX compiler that implements the concurrent AND-EQ operation between multiple bits.

In step 910, the method may receive as input a section mask vector sm (a vector of selected sections), a plat mask vector pm (a vector of selected plats), a donor matrix D and a left receiver matrix L. In step 920, the method may create a Tartan matrix M by computing the outer product between section mask vector sm and plat mask vector pm.

In step 930, the method may compute a bitwise AND between matrices L and D and may store the result in a temporary matrix Temp. In step 940, the method may compute a bitwise XOR between matrices L and Temp and may store the result back to matrix Temp. In step 950, the method may compute a bitwise AND between matrices M and Temp. In step 960, the method may compute a bitwise XOR between matrices L and Temp and in step 970, the method may copy matrix Temp back to L.

The BELEX compiler may support creating APL code for an OR-EQ operation which may replace matrix L with L OR D in the masked-on positions of L.

In BELEX, the OR-EQ between data in matrices D and data in L is done using the Tartan matrix M according to equation 5:

$$L' = L + M \times (D + (L \times D)) \quad \text{Equation 5}$$

The equation ensures that the replacement is done only in those positions where matrix M has on bits (1) and leave original data in matrix L where matrix M has off bits (0).

Figure 10:
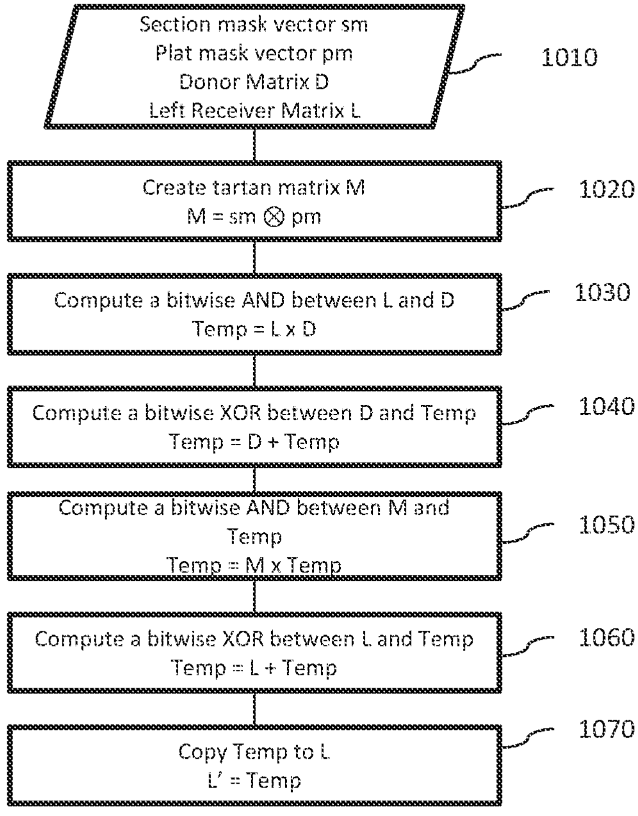
FIG. 10 is a schematic illustration of a method describing the functionality for implementing a concurrent OR operation between multiple bits according to an embodiment of the present invention.

FIG. 10, to which reference is now made, is a schematic illustration of a method describing the functionality of the APL code generated by the BELEX compiler that implements the concurrent OR-EQ operation between multiple bits.

In step 1010, the method may receive as input a section mask vector sm (a vector of selected sections), a plat mask vector pm (a vector of selected plats) a donor matrix D and a left receiver matrix L. In step 1020, the method may create a Tartan matrix M by computing the outer product between section mask vector sm and plat mask vector pm.

In step 1030, the method may compute a bitwise AND between matrices L and D and store the result in a temporary matrix Temp. In step 1040, the method may compute a bitwise XOR between matrices D and Temp and store the result back to matrix Temp. In step 1050, the method may compute a bitwise AND between matrices M and Temp. In step 1060, the method may compute a bitwise XOR between matrices L and Temp and in step 1070, the method may copy matrix Temp back to matrix L.

Figure 11A:
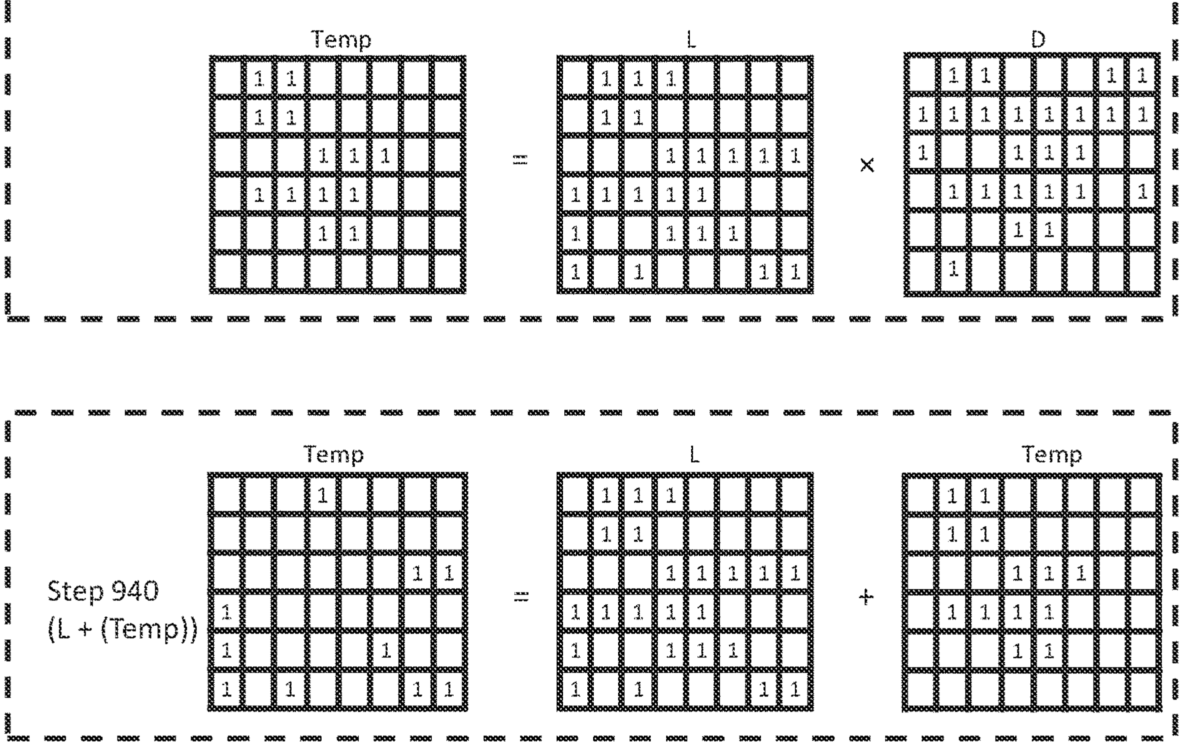
FIGS. 11A and 11B provide an illustration of the outcome of performing the steps of the AND operation of FIG. 9 between matrices L and D of FIG. 6 using the Tartan matrix M created according to the method of FIG. 5 according to an embodiment of the present invention.
Figure 11B:
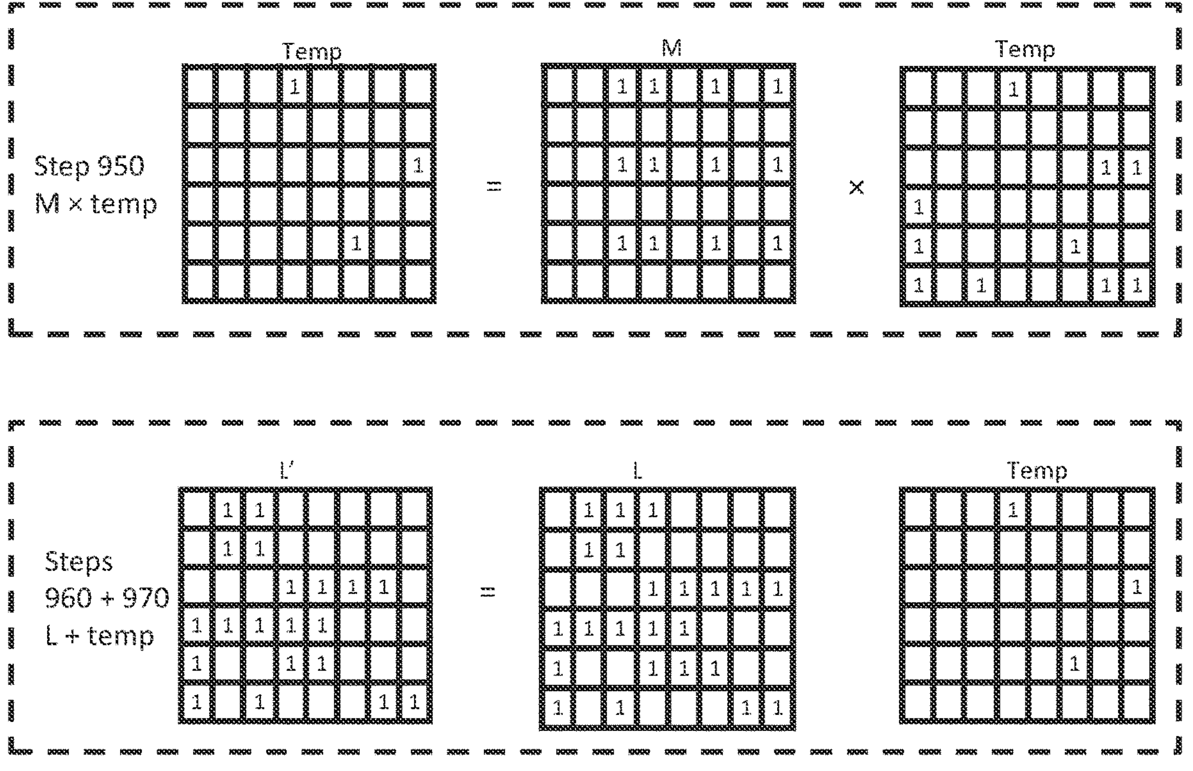

FIGS. 11A and 11B, to which reference is now made, provide an illustration of the outcome of performing the steps of the AND-EQ operation of FIG. 9 between matrices L and D of FIG. 6 using the Tartan matrix M created according to the method of FIG. 5.

BELEX compiler supports two levels of programming in the same code: high-level BELEX and low-level BELEX. Low-level BELEX may support low-level operations (APL like) and high-level BELEX high-level may use Tartan concepts to enable the user to write his/her algorithm using linear-algebra concepts. The BELEX compiler supports both levels in the same code and allows the programmer to write high-level and low-level code together in one program using the same compiler.

It may be appreciated that a high-level language such as BELEX, that uses linear-algebra concepts for programming the APU built to perform concurrent in-memory computations, may be preferred by programmers. The high-level language may be processed by the BELEX compiler into machine-level language APL. Programmers may prefer the high-level language for mathematical convenience in writing algorithms that are more obviously correct to the human, which may save the error-prone manual process of converting mathematical expressions into machine code.

It may further be appreciated that a language that supports both high-level code and low-level code provides higher flexibility while maintaining the efficiency and speed of executed code. In those cases where the user desires to write all details of the machine operation in low-level language, the user may mix and match Tartan high-level language and BELEX low-level language in the same program.

It may be appreciated that the steps shown for the methods herein above are not intended to be limiting and that each method may be practiced with variations. These variations may include more steps, less steps, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for concurrently performing multiple computations in an associative processing unit (APU), the method comprising:

having data in a donor matrix and in a left receiver matrix, wherein said matrices represent data stored in a first portion and a second portion of a memory array of said APU, respectively, and wherein each portion comprises cells arranged in rows and columns, wherein activating a first cell and a second cell located on a same location in different portions provides a result of a Boolean operation between said first and second cells;

creating a Tartan matrix by computing an outer product between a first bit vector indicating selected rows and a second bit vector indicating selected columns, wherein said Tartan matrix represents data stored in a third portion of said memory array and wherein all cells having a value 1 in said Tartan matrix are selected cells; and concurrently activating all cells of said donor matrix, said left receiver matrix and said Tartan matrix and storing a result of Boolean operations therebetween in said left receiver matrix wherein a new value is obtained on cells located at a same row and a same column as said selected cells in said Tartan matrix and an original value remains on other cells.

2. The method of claim 1 wherein said creating a Tartan matrix comprises initializing cells in said third portion to a value of 0 and concurrently setting a value 1 to cells located in any of said selected rows and selected columns in said third portion.

3. The method of claim 1 wherein said concurrently activating further comprises:

concurrently performing a XOR Boolean operation between all cells storing said donor matrix and all cells storing said left receiver matrix and storing a result in a temporary matrix stored in a temporary portion of said memory array;

concurrently performing an AND Boolean operation between all cells of said Tartan matrix and all cells of said temporary matrix and storing a result in said temporary matrix;

concurrently performing a XOR Boolean operation between all cells of said left receiver matrix and all cells of said temporary matrix and storing a result in said temporary matrix; and concurrently copying all cells of said temporary matrix to said left receiver matrix thereby providing in said left receiver matrix a value of selected cells of said donor matrix.

4. The method of claim 1 wherein said concurrently activating further comprises:

concurrently performing an AND Boolean operation between all cells of said donor matrix and all cells of said Tartan matrix and storing a result in a temporary matrix stored in a temporary portion of said memory array;

concurrently performing a XOR Boolean operation between all cells of said left receiver matrix and all cells of said temporary matrix and storing a result in said temporary matrix; and concurrently copying all cells of said temporary matrix to said left receiver matrix thereby providing in said left receiver matrix a result of a XOR operation between selected cells of said left receiver matrix and selected cells of said donor matrix.

5. The method of claim 1 wherein said concurrently activating further comprises:

concurrently performing an AND Boolean operation between all cells of said donor matrix and all cells of said left receiver matrix and storing a result in a temporary matrix stored in a temporary portion of said memory array;

concurrently performing a XOR Boolean operation between all cells of said left receiver matrix and all cells of said temporary matrix and storing a result in said temporary matrix;

concurrently performing an AND Boolean operation between all cells of said Tartan matrix and all cells of said temporary matrix and storing a result in said temporary matrix;

concurrently performing a XOR Boolean operation between all cells of said left receiver matrix and all cells of said temporary matrix and storing a result in said temporary matrix; and concurrently copying all cells of said temporary matrix to said left receiver matrix thereby providing in said left receiver matrix a result of an AND operation between selected cells of said left receiver matrix and selected cells of said donor matrix.

6. The method of claim 1 wherein said concurrently activating further comprises:

concurrently performing an AND Boolean operation between all cells of said donor matrix and all cells of said left receiver matrix and storing a result in a temporary matrix stored in a temporary portion of said memory array;

concurrently performing a XOR Boolean operation between all cells of said donor matrix and all cells of said temporary matrix and storing a result in said temporary matrix;

concurrently performing an AND Boolean operation between all cells of said Tartan matrix and all cells of said temporary matrix and storing a result in said temporary matrix;

concurrently performing a XOR Boolean operation between all cells of said left receiver matrix and all cells of said temporary matrix and storing a result in said temporary matrix; and concurrently copying all cells of said temporary matrix to said left receiver matrix thereby providing in said left receiver matrix a result of an OR operation between selected cells of said left receiver matrix and selected cells of said donor matrix.

7. The method of claim 1 and further comprising creating a plurality of APU instructions including commands to create said Tartan matrix and commands to perform said Boolean operations between said left receiver matrix, said donor matrix and said Tartan matrix to provide results of said Boolean operations on selected cells of said left receiver matrix.

8. A method for concurrently performing multiple computations in an associative processing unit (APU), the method comprising:

having a plurality of pairs of multi-bit numbers, a first number of each pair stored in cells of a plat of a first vector register storing a donor matrix, a second number of each pair stored in a plat of a second vector register storing a left receiver matrix;

receiving a section mask bit vector indicating selected sections and a plat mask bit vector indicating selected plats for a computation between said matrices;

creating a Tartan matrix by computing an outer product between said section mask bit vector and said plat mask bit vector and storing said Tartan matrix in a third vector register, wherein a selected cell is indicated by a value 1 in said Tartan matrix; and activating bit-lines of said APU connecting cells of said donor matrix, said left receiver matrix and said Tartan matrix and writing a result of a computation back to said left receiver matrix wherein a new value is obtained on selected cells and an original value remains on not selected cells.

9. The method of claim 8 wherein said creating a Tartan matrix comprises initializing cells in said third vector register to a value of 0 and concurrently setting a value 1 to cells located in a section from said section mask bit vector and a plat from said plat mask bit vector.

10. The method of claim 8 wherein said activating bit-lines further comprises:

concurrently performing a XOR Boolean operation between all cells of said first vector register storing said donor matrix, and all cells of said second vector register storing said left receiver matrix and storing a result in a temporary vector register;

concurrently performing an AND Boolean operation between all cells of said third vector register storing said Tartan matrix and all cells of said temporary vector register and storing a result in said temporary vector register;

concurrently performing a XOR Boolean operation between all cells of said second vector register storing said left receiver matrix and all cells of said temporary vector register and storing a result in said temporary vector register; and concurrently copying all cells of said temporary vector register to said second vector register thereby providing in said second vector register a value of selected bits of said multi-bit numbers stored in said first vector register.

11. The method of claim 8 wherein said concurrently activating further comprises:

concurrently performing an AND Boolean operation between all cells of said first vector register storing said donor matrix, and all cells of said third vector register storing said Tartan matrix and storing a result in a temporary vector register;

concurrently performing a XOR Boolean operation between all cells of said second vector register storing said left receiver matrix, and all cells of said temporary vector register and storing a result in said temporary vector register; and concurrently copying all cells of said temporary vector register to said second vector register thereby providing in said second vector register a result of a XOR operation between selected bits of said plurality of pairs of multi-bit numbers.

12. The method of claim 8 wherein said concurrently activating further comprises:

concurrently performing an AND Boolean operation between all cells of said first vector register storing said donor matrix, and all cells of said second vector register storing said left receiver matrix and storing a result in a temporary vector register;

concurrently performing a XOR Boolean operation between all cells of said second vector register storing said left receiver matrix and all cells of said temporary vector register and storing a result in said temporary vector register;

concurrently performing an AND Boolean operation between all cells of said third vector register storing said Tartan matrix and all cells of said temporary vector register and storing a result in said temporary vector register;

concurrently performing a XOR Boolean operation between all cells of said second vector register storing said left receiver matrix and all cells of said temporary vector register and storing a result in said temporary vector register; and concurrently copying all cells of said temporary vector register to said second vector register thereby providing in said second vector register a result of an AND operation between selected bits of said plurality of pairs of multi-bit numbers.

13. The method of claim 8 wherein said concurrently activating further comprises:

concurrently performing a AND Boolean operation between all cells of said first vector register storing said donor matrix, and all cells of said second vector register storing said left receiver matrix and storing a result in a temporary vector register;

concurrently performing a XOR Boolean operation between all cells of said first vector register storing said donor matrix and all cells of said temporary vector register and storing a result in said temporary vector register;

concurrently performing an AND Boolean operation between all cells of said third vector register storing said Tartan matrix and all cells of said temporary vector register and storing a result in said temporary vector register;

concurrently performing a XOR Boolean operation between all cells of said second vector register storing said left receiver matrix and all cells of said temporary vector register and storing a result in said temporary vector register; and concurrently copying all cells of said temporary vector register to said second vector register thereby providing in said second vector register a result of an OR operation between selected bits of said plurality of pairs of multi-bit numbers.

14. The method of claim 8 and further comprising receiving an operation to perform between said pairs of multi-bit numbers and creating a plurality of APU instructions including commands to create said Tartan matrix and commands to perform Boolean operations between said left receiver matrix, said donor matrix and said Tartan matrix to provide in said second vector register results of said operation between said pairs of multi-bit numbers.

* * * * *